(12) United States Patent
Harrison et al.

(10) Patent No.: US 10,181,034 B2
(45) Date of Patent: Jan. 15, 2019

(54) VIRTUAL MACHINE SECURITY

(71) Applicant: Sophos Limited, Abingdon (GB)

(72) Inventors: Richard Barlow Harrison, Abingdon (GB); Andrew Colin Piper, Waterloo (CA); Mark Bond, Bracknell (GB); Robert Allsworth, Oxford (GB); Kenneth D. Ray, Seattle, WA (US)

(73) Assignee: Sophos Limited, Abingdon (GB)

(*) Notice: Subject to any disclaimer, the term of this patent is extended or adjusted under 35 U.S.C. 154(b) by 263 days.

(21) Appl. No.: 15/042,955

(22) Filed: Feb. 12, 2016

(65) Prior Publication Data

US 2017/0235951 A1 Aug. 17, 2017

(51) Int. Cl.
*G06F 21/56* (2013.01)
*G06F 8/61* (2018.01)
*G06F 9/455* (2018.01)

(52) U.S. Cl.
CPC .............. *G06F 21/561* (2013.01); *G06F 8/61* (2013.01); *G06F 8/62* (2013.01); *G06F 9/45558* (2013.01); *G06F 21/564* (2013.01); *G06F 2009/45587* (2013.01); *G06F 2221/034* (2013.01)

(58) Field of Classification Search
CPC ........ G06F 21/561; G06F 21/564; G06F 8/62; G06F 8/61; G06F 9/45558; G06F 2221/034; G06F 2009/45587
See application file for complete search history.

(56) References Cited

U.S. PATENT DOCUMENTS

| 9,009,836 | B1 * | 4/2015 | Yarykin | G06F 9/45558 726/24 |
|---|---|---|---|---|
| 2013/0061012 | A1 * | 3/2013 | Turner | G06F 21/52 711/159 |
| 2014/0181975 | A1 * | 6/2014 | Spernow | G06F 21/562 726/23 |
| 2017/0192810 | A1 * | 7/2017 | Lukacs | G06F 9/44526 |

OTHER PUBLICATIONS

IPO, "UK Application No. 1702143.7 Search Report dated Jul. 21, 2017", 3 pages.

* cited by examiner

*Primary Examiner* — Khoi V Le
(74) *Attorney, Agent, or Firm* — Strategic Patents, P.C.

(57) ABSTRACT

A virtual machine transmits local files to a secure virtual machine hosted by a hypervisor for malware detection. When malware is detected, the secure virtual machine can responsively provide remediation code to the virtual machine on a temporary basis so that the virtual machine can perform suitable remediation without a permanent increase in size of the virtual machine.

20 Claims, 11 Drawing Sheets

VIRTUAL MACHINE SECURITY

TECHNICAL FIELD

This application relates to computer security for machines executing virtualized environments.

BACKGROUND

Within a virtualized environment, reducing the footprint for each guest virtual machine (GVM) permits a greater number of machines to run on a single hardware device. While prior art techniques reduce overhead by offloading antivirus (AV) scanning and the like to a centralized resource, this also loses some of the advantages of a local malware agent. There remains a need for improved virtual machine security that provides full malware protection while reducing the footprint of each guest virtual machine.

SUMMARY

A virtual machine transmits local files to a secure virtual machine hosted by a hypervisor for malware detection. When malware is detected, the secure virtual machine can responsively provide remediation code to the virtual machine on a temporary basis so that the virtual machine can perform suitable remediation without a permanent increase in size of the virtual machine.

In an aspect, a computer program product for managing malware in a virtualized environment may include computer executable code embodied in a non-transitory computer readable medium that, when executing on one or more computing devices, performs the steps of detecting an access to a file on a virtual machine, transmitting the file to a secure virtual machine hosted by a hypervisor for the virtual machine, and analyzing the file with an antivirus scanner on the secure virtual machine. When the antivirus scanner identifies a known malware component, the secure virtual machine may perform the steps of selecting one of a plurality of tools for malware-specific remediation of the known malware component, where the plurality of tools include multiple configurations of a generic removal tool, determining one or more actions required to remediate the known malware component, and configuring the generic removal tool to perform one or more actions, thereby providing a selected tool. The computer executable code may further perform the steps of transmitting the selected tool to the virtual machine, receiving the selected tool at the virtual machine, executing the selected tool on the virtual machine, receiving an execution status for the selected tool at the secure virtual machine, and, when the execution status indicates a success for a remediation, transmitting a tool removal instruction to the virtual machine.

In another aspect, a system includes a data store including information identifying a plurality of known malware components and a plurality of tools for malware-specific remediation. The system may also include a first virtual machine, where the first virtual machine may include a guest agent configured to respond to an access to a file on the first virtual machine by transmitting the file to an antivirus scanner at a remote location. The guest agent may be further configured to receive one of the plurality of tools in response. The system may further include a hypervisor for managing a plurality of virtual machines including the first virtual machine and a secure virtual machine, the secure virtual machine hosting the antivirus scanner, and the secure virtual machine configured to respond to a receipt of the file from the first virtual machine by analyzing the file with the antivirus scanner and, when one of the plurality of known malware components is identified by the antivirus scanner, to perform the steps of selecting at least one tool of the plurality of tools, where the tool corresponds to one of the plurality of known malware components identified by the antivirus scanner, transmitting the tool to the first virtual machine, receiving an execution status for the tool, and when the execution status indicates a success for a remediation, transmitting a tool removal instruction to the first virtual machine to remove the tool.

Implementations may include one or more of the following features. The guest agent of the first virtual machine may be further configured to perform the steps of receiving the tool from the secure virtual machine, installing the tool, executing the tool, and transmitting the execution status to the secure virtual machine. The guest agent of the first virtual machine may be further configured to respond to the tool removal instruction by uninstalling the tool on the first virtual machine. The plurality of tools may include multiple configurations of a generic removal tool. The secure virtual machine may determine one or more actions required to remediate one of the plurality of known malware components and may configure the generic removal tool to perform one or more actions. The one or more actions may include one or more of a file deletion, a process termination, and a removal of registry keys. The execution status may be selected from a group consisting of a success indicating that the remediation was successful, a failure indicating that the remediation could not be completed, an error indicating that the tool could not be executed, and an incomplete indicating that one or more additional steps are required to complete the remediation. The guest agent on the first virtual machine may be configured to perform an on-demand scan at a time selected by the hypervisor, where the on-demand scan includes an installation of an antivirus tool, an execution of the antivirus tool, and a removal of the antivirus tool. The guest agent on the first virtual machine may be configured to perform a rootkit scan by performing the steps of receiving a rootkit scanner, installing the rootkit scanner, uninstalling the rootkit scanner, reporting a result of the rootkit scanner to the secure virtual machine, receiving a rootkit removal tool responsive to the result from the secure virtual machine, installing the rootkit removal tool, executing the rootkit removal tool, and uninstalling the rootkit removal tool.

In an aspect, a method may include detecting an access to a file on a virtual machine, transmitting the file to a secure virtual machine hosted by a hypervisor for the virtual machine, and analyzing the file with an antivirus scanner on the secure virtual machine. When the antivirus scanner identifies a known malware component, the method may include selecting one of a plurality of tools for malware-specific remediation of the known malware component, thereby providing a selected tool, transmitting the selected tool to the virtual machine, receiving the selected tool at the virtual machine, executing the tool on the virtual machine, receiving an execution status for the selected tool at the secure virtual machine, and when the execution status indicates a success for a remediation, transmitting a tool removal instruction to the virtual machine.

Implementations may include one or more of the following features. The method may further include installing the tool on the virtual machine, and after executing the tool, transmitting the execution status to the secure virtual machine. The virtual machine may respond to the tool removal instruction by uninstalling the selected tool on the virtual machine. The plurality of tools may include multiple configurations of a generic removal tool. The secure virtual machine may perform the steps of determining one or more actions required to remediate the known malware component and configuring the generic removal tool to perform the one or more actions. The one or more actions may include a file deletion, a process termination, and a removal of registry keys. The execution status may be selected from a group consisting of a success indicating that the remediation was successful, a failure indicating that the remediation could not be completed, an error indicating that the selected tool could not be executed, and an incomplete indicating that one or more additional steps are required to complete the remediation. Detecting the access to the file may include receiving a right-click scan request for the file in a user interface of the virtual machine. The method may further include scheduling an on-demand scan for the virtual machine with the hypervisor at a predetermined time, transmitting an antivirus tool to the virtual machine at the predetermined time, installing the antivirus tool on the virtual machine, executing the antivirus tool on the virtual machine, and removing the antivirus tool from the virtual machine. The selected tool may be a rootkit removal tool, and the method may further include receiving a rootkit scanner at the virtual machine, installing the rootkit scanner, uninstalling the rootkit scanner, reporting a result of the rootkit scanner to the secure virtual machine, receiving a rootkit removal tool responsive to the result at the virtual machine from the secure virtual machine, installing the rootkit removal tool, executing the rootkit removal tool, and uninstalling the rootkit removal tool.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale and are instead intended to illustrate the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein. Furthermore, each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Figure 1:
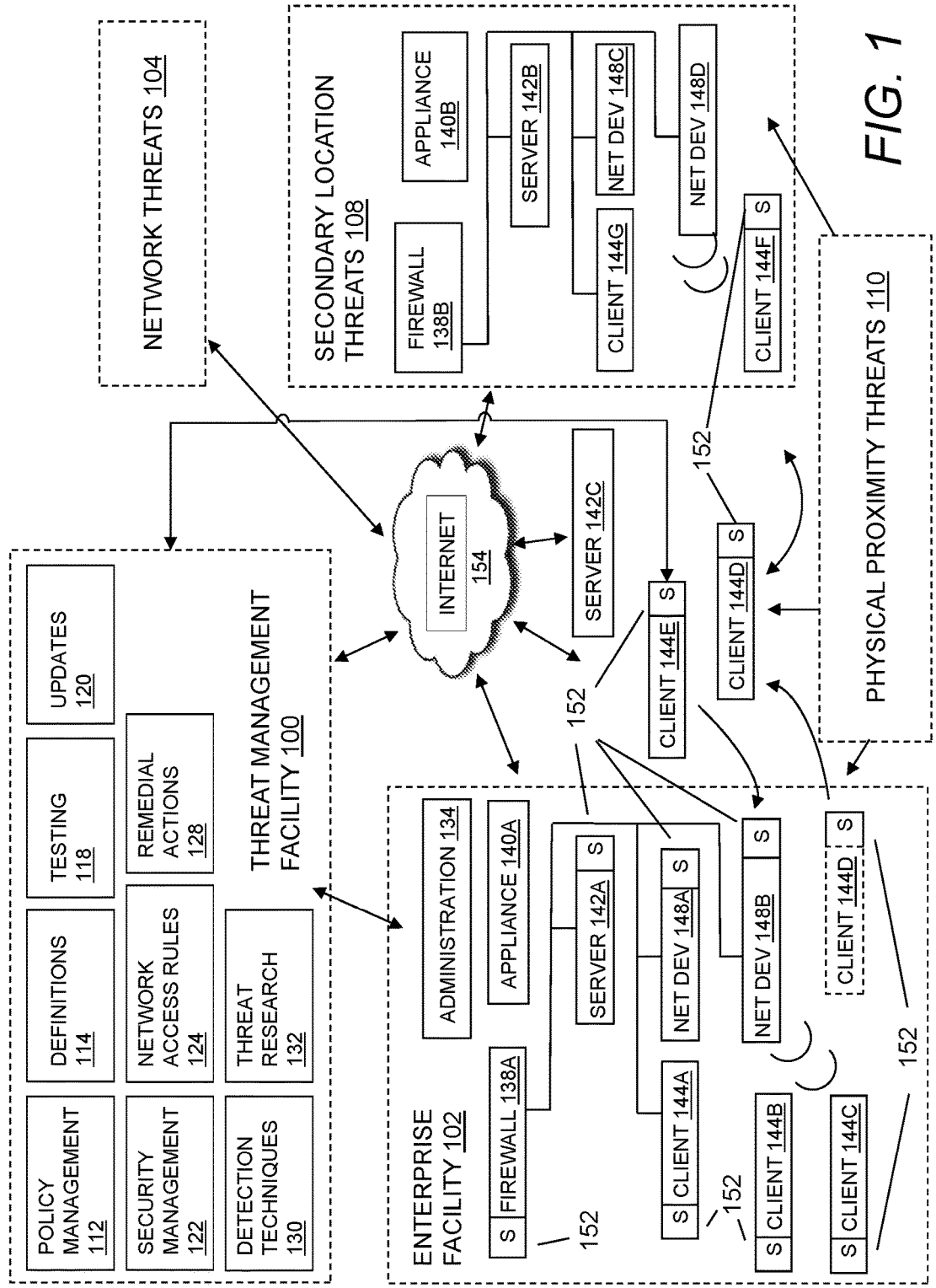
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility 100 can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services that may include policy management. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like. The enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like. The enterprise facility 102 may include a computer network, which may be distributed amongst a plurality of facilities and in a plurality of geographical locations. The enterprise facility 102 computer network may include administration 134, a firewall 138A, an appliance 140A, a server 142A, network devices 148A-B, clients 144A-D, and the like. The aforementioned devices within the enterprise facility 102 computer network may be protected by endpoint computer security facilities 152. It will be understood that any reference herein to client facilities may include the clients 144A-D shown in FIG. 1 and vice-versa.

The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions, and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, the security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VoIP, instant messaging, peer-to-peer file sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security management facility 122 may access the rules within a policy facility to determine if the requested access is related to a sporting website. In an embodiment, the security management facility 122 may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies, which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security management facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security management facility 122 and policy management facility 112 may push information to the enterprise facility 102 network and/or client facility. The enterprise facility 102 network and/or client facility may also or instead pull information from the security management facility 122 and policy management facility 112 network server facilities 142, or there may be a combination of pushing and pulling of information between the security management facility 122 and the policy management facility 112 network servers 142, enterprise facility 102 network, and client facilities, or the like. For example, the enterprise facility 102 network and/or client facility may pull information from the security management facility 122 and policy management facility 112 network server facility 142 may request the information using the security management facility 122 and policy management facility 112 update module; the request may be based on a certain time period, by a certain time, by a date, on demand, or the like. In another example, the security management facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security management facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility from within the network, definition files may be provided to the client facility from an external computing facility from an external network, or the like.

A threat definition facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
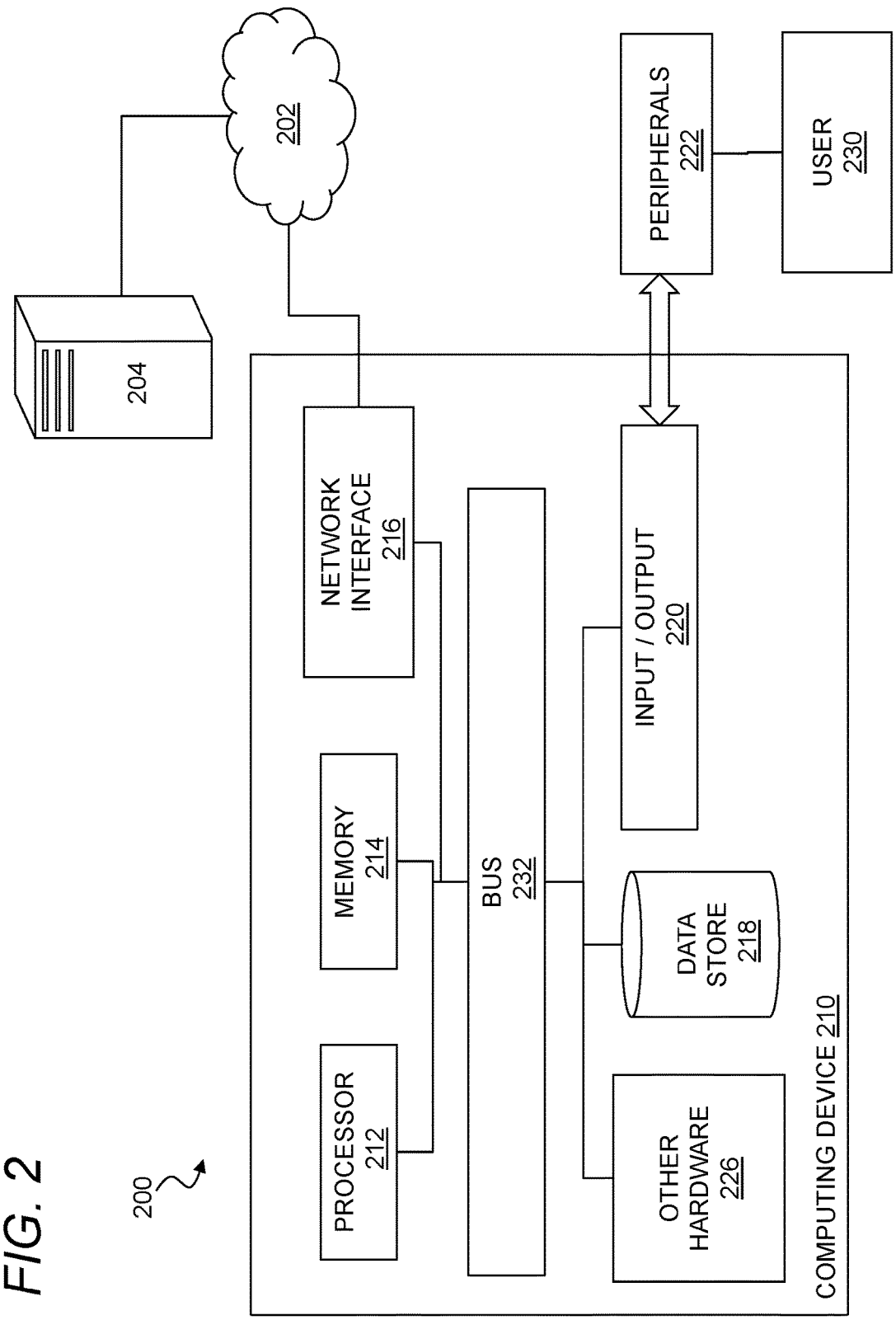
FIG. 2 illustrates a computer system.

FIG. 2 illustrates a computer system 200. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Having provided an overall context for threat detection and computer systems, the description now turns to a brief discussion of examples of virtual machine sharing environments that may be part of, or otherwise implemented with, the environments and systems described above. For example, the following virtual machine sharing embodiments may be managed by a threat management facility, such as those described herein.

Figure 3:
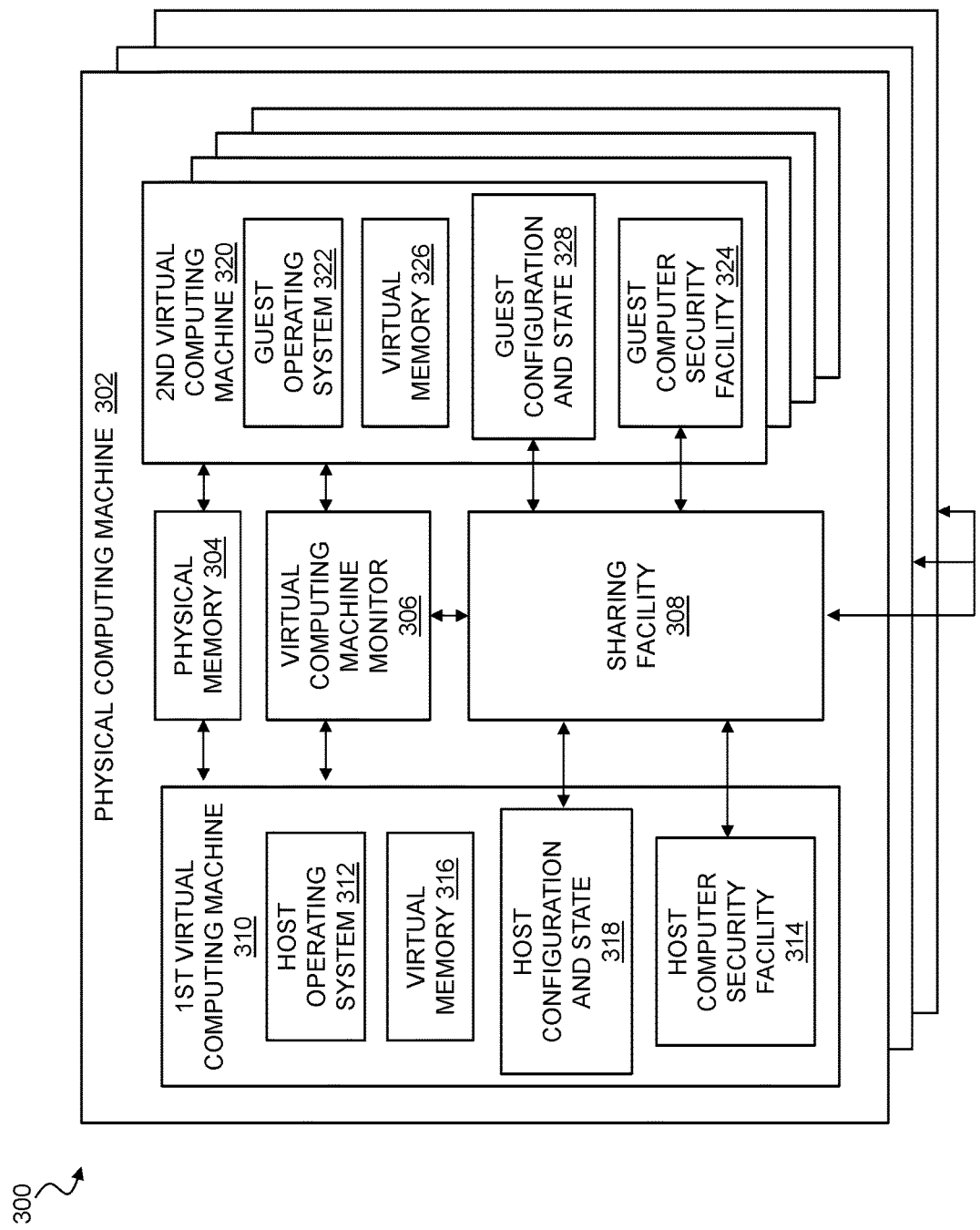
FIG. 3 illustrates a virtualized environment.

FIG. 3 illustrates a virtualized environment 300. The virtualized environment 300 may include a physical computing machine 302, a physical memory 304, a virtual computing machine monitor 306, a sharing facility 308, and one or more virtual computing machines which may include a first virtual computing machine 310 and a second virtual computing machine 320.

The physical computing machine 302 may include an endpoint client or a server such as any of the computing devices described above. The physical computing machine 302 may act as a single processing entity, where there is a single operating system on the machine, e.g., the host operating system 312 shown in the figure, and where this single processing entity has all of the physical resources of the machine available for its use. However, a computer may also be partitioned or multiplexed into a plurality of virtual computing machines, where each virtual computing machine runs its own operating system, e.g., the host operating system 312 and the guest operating system 322 shown in the figure.

A virtual computing machine configuration may be implemented to establish multiple isolated virtual machines on a single hardware platform, which permits machines to be added, removed, or reconfigured according to current demand. While this permits flexible deployment of computing resources, the size of memory on a physical device places corresponding limits on the number of virtual machines that can be instantiated before a new physical machine is required. For instance, a plurality of virtual computing machines configured on a single physical computing machine 302 may each have their own copies of an endpoint computer security facility, e.g., the first computer security facility 314 and the second computer security facility 324 shown in the figure, running on the same physical computing machine 302 and competing for shared physical resources such as processing capability and physical memory 304. This can place limitations on the capability of a single physical computing machine 302 in accommodating a large number of virtual computing machines. The techniques described herein can reduce the size of each virtual machine and thus increase the number of virtual computing machines on a single physical computing machine 302.

The virtual computing machine monitor 306 may be a hypervisor, e.g., a software program that provides virtualization of number of virtual computer machines. Further, in embodiments, the virtual computing machine monitor 306 may run directly on the physical computing machine 302 as shown in the drawing, i.e., in association with an operating system. The virtual computing machine monitor 306 may receive and scan a file using any suitable techniques, or the virtual computing machine monitor 306 may transmit the file to another isolated environment for further testing and analysis. This separate virtual computing machine may act as a protective environment that isolates the file from other virtual machines. In addition, the separate virtual computing machine that initiated the isolation may now safely monitor shared information, such as state information, from outside the isolated virtual computing machine. This ability to create virtual computing machines that act as a protective environment, coupled with shared information, may provide an increased security for potentially harmful files and processes.

The sharing facility 308 may allow for the sharing of information and resources between virtual machines. In embodiments, providing a sharing facility 308 associated with the use of a plurality of virtual computing machines enables greater efficiencies in the use of physical memory 304 and processing in order to increase the number of virtual computing machines that may be accommodated with a single physical computing machine 302. The sharing facility 308 may also or instead decrease the overlap of software applications and processes, allow for the sharing of information between virtual computing machines to increase the efficiency of malware detection methods, decrease the overlap of malware scanning amongst virtual computing machines in order to decrease processing load, share system and application configuration and state information to provide greater system uniformity, and the like. In some implementations, the sharing facility 308 may be a shared data store. In some implementations, the sharing facility 308 may be implemented with one or more network communication protocols. In some implementations, the sharing facility 308 may be one or more network communication sockets. In some implementations, the sharing facility 308 may be one or more messaging facilities that operate in each virtual computing machine 310, 320 and the virtual computing machine monitor 306. In some implementations, the sharing facility 308 may be a virtual message bus that may be used for communication among one or more of the virtual computing machines 310, 320 and/or the virtual computing machine monitor 306.

Although FIG. 3 shows the physical computing machine 302 as including two virtual computing machines, i.e. the first virtual computing machine 310 and the second virtual computing machine 320, one skilled in the art will recognize that the physical computing machine 302 may include any number of virtual computing machines.

In general, the first virtual computing machine 310 may include a host operating system 312, a virtual memory 316, a host configuration and state facility 318, and the host computer security facility 314 referred to above, all of which may be instantiated on the physical computing machine 302. The first virtual computing machine 310 may serve as a hypervisor to manage other virtual machines instantiated on the physical computing machine 302 or in some more general context.

The host operating system 312 may include a program loaded onto the computer during boot time that controls other programs such as applications, background processes, and the like. The host operating system 312 may be associated with the virtual memory 316.

The virtual memory 316 may hold instructions related to the host operating system 312. The virtual memory 316 may also or instead hold information related to the host configuration and state facility 318, i.e. configuration and state information. The host configuration and state facility 318 may store information related to configuration such as operating system configuration information, firewall configuration, information application, configuration information, and the like.

The host computer security facility 314 may hold information related to security of the first virtual computing machine 310 such as detection of suspicious programs, malware detection, and the like.

The second virtual computing machine 320 may include a guest operating system 322, a virtual memory 326, a guest configuration and state facility 328, and the guest computer security facility 324 referred to above, all of which may be instantiated on the physical computing machine 302. The guest operating system 322 may be a different operating system than that included in the host operating system 312. The guest operating system 322 may also or instead store program instructions specific to the guest operating system 322 in the virtual memory 326. The virtual memory 326 may store configuration and state information specific to the second virtual computing machine 320. In addition, the virtual memory 326 may be associated with the guest configuration and state facility 328. The guest configuration and state facility 328 may be associated with the guest computer security facility 324. The guest computer security facility 324 may store the information related to malware and access control. In general, any number of guest virtual machines may be instantiated on the physical computing machine 302 and managed by the host machine, subject to physical limitations of the physical computing machine 302 and corresponding software.

The first virtual computing machine 310 and the second virtual computing machine 320 may share a common physical memory 304. The common physical memory 304 may store process information of programs associated with each of the virtual computing machines. The process information may include the processing time of a processing resource, the removal of a processing requirement of the virtual computing machines, and the like. In embodiments, the first virtual computing machine 310 and the second virtual computing machine 320 may be associated with the virtual computing machine monitor 306. The virtual computing machine monitor 306 may provide a software layer that implements virtualization for running multiple virtual computing machines. For example, the virtual computing machine monitor 306 may provide the software layer for each of the first virtual computing machine 310 and the second virtual computing machine 320.

In embodiments, the first virtual computing machine 310 and the second virtual computing machine 320 may be associated with the sharing facility 308. The sharing facility 308 may provide for the sharing of information between the virtual computing machines, and may include one or more software programs to facilitate such sharing.

Having provided an example of a virtualized environment, the description now turns to specific devices, systems, and methods for virtual machine security. The following security techniques may be used in addition to, in conjunction with, or to supplement the threat detection system, computer system, and virtualized environment described above. In another aspect, the devices, systems, and methods for virtual machine security are separate from any systems described above.

In general, the devices, systems, and methods described herein may advantageously allow for the installation, execution, and removal of security components onto virtual machines only when required or appropriate, avoiding a need for an installation of large malware detection and remediation code bases on new virtual machines. This approach advantageously increases the number of virtual machines that can be executed on a single physical device. Detection can be performed on the hypervisor or some other management code or system for the virtual environment, and code for remediation can be deployed on an as-needed basis according to threat detection. To further improve performance, remediation code can be uninstalled or otherwise cleaned up or removed when remediation is complete. A variety of remediation functions can thus be deployed as-needed and without permanent software installation including without limitation full cleanup of malware, right-click scanning, on-demand scanning, rootkit scanning, rootkit cleanup, memory scanning, kernel memory scanning, and so forth.

Figure 4:
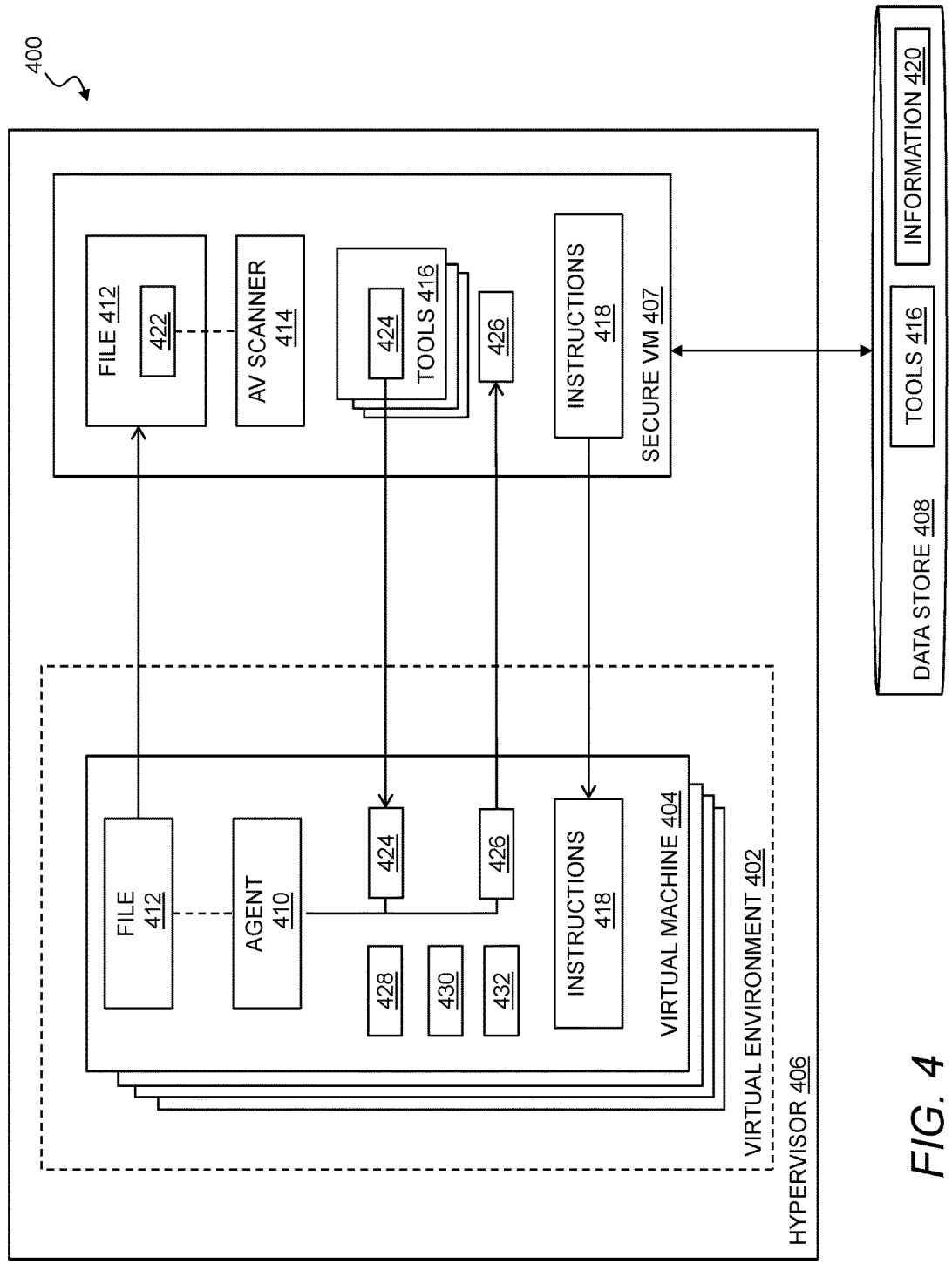
FIG. 4 illustrates a system for managing malware in a virtualized environment.

FIG. 4 illustrates a system 400 for managing malware in a virtualized environment. The system 400 may include a virtual environment 402 having one or more virtual machines 404, a hypervisor 406, one or more secure virtual machines 407, and a data store 408.

The virtual environment 402 and the one or more virtual machines 404 may be the same or similar to any as discussed elsewhere herein or otherwise known in the art. The one or more virtual machines 404 may include a first virtual machine having an agent 410.

The hypervisor 406 may be configured to manage a plurality of virtual machines 404. The hypervisor 406 may be co-located on a physical device hosting the virtual machines 404, or the hypervisor 406 may be a remote from the physical device. Similarly, the hypervisor 406 may be locally coupled to the virtual machines 404, or connected through a virtual or physical network for remote access to and management of the virtual machines 404.

The hypervisor 406 may host one or more of the plurality of virtual machines 404 and one or more secure virtual machines 407 that include components and the programmed logic for performing management and security functionality for the virtual machines 404. In general, the hypervisor 406 may include software that allows the virtual machines 404 to be run from a physical host. In an aspect, communication between the secure virtual machine 407 and the virtual machines 404 is undertaken via a network connection. The network connection may be a network connection with traffic that uses a physical network interface. The network connection may be a network connection with traffic that uses the same physical network interface. The network connection may be a virtual network connection that is maintained by the hypervisor 406 without use of a physical network interface. Although generally the secure virtual machine 407 hosted by the hypervisor 406 is described as performing various security functionality tasks for the virtual machines 404 (e.g., scanning and the like), one of ordinary skill will recognize that these tasks may also or instead be performed on the hypervisor 406, on another machine, and so on.

The hypervisor 406 may host a secure virtual machine 407 that includes an antivirus scanner 414 or the like. It should be understood that the term 'antivirus scanner' as used in this context is intended to refer broadly to any tool or the like that might be used to analyze the file 412 for potential threats. Thus the antivirus scanner 414 may apply static analysis, behavioral analysis, contextual analysis, or any other technique or combination of techniques suitable for detecting malware. The secure virtual machine 407 hosted by the hypervisor 406 may also or instead include a plurality of tools 416 for malware-specific remediation. The secure virtual machine 407 may further include instructions 418, such as those for removing one or more of the tools 416 temporarily installed on the virtual machines 404. Alternatively, the secure virtual machine 407 may be in communication with a component that may include a plurality of tools 416 and instructions 418. Examples of such a component include the data store 408, a remote threat management facility, a third-party service, or the like. It will be understood that the antivirus scanner 414 and the tools 416 may be deployed on the secure virtual machine 407 hosted by the hypervisor 406, or at some other logical or physical location where they can be coordinated by the hypervisor 406.

Although shown as separately included on the secure virtual machine 407 hosted by the hypervisor 406, the antivirus scanner 414 may include the tools 416, instructions 418, and so on.

In an aspect, the secure virtual machine 407 is dedicated for the remediation of malware present on the other virtual machines 404. In an aspect, limiting the type of applications that are run on the secure virtual machine 407 may help protect the secure virtual machine 407 from malware attacks. The secure virtual machine 407 may also include additional security-related features. For example, the secure virtual machine 407 may use or maintain encrypted data storage. For example, the secure virtual machine 407 may limit access, for example by limiting access from certain network addresses or only directly from the hypervisor 406, or by having login requirements, such as two factor authentication or requiring certificates. For example, the secure virtual machine 407 may have an application to limit the processes that can run on the secure virtual machine 407 to a list of approved processes.

The data store 408 may include information 420 for use by one or more of the components of the system 400, e.g., the secure virtual machine 407 hosted by the hypervisor 406. The information 420 may include various forms of information useful for threat detection, analysis and remediation. For example, the information 420 may include a signature database for threat detection using static analysis. The information 420 may also or instead include reputation information that characterizes reputations of network locations, software publishers, and so forth. The information 420 may also or instead include information for behavioral analysis, or other information relevant to threat detection such as blacklists, whitelists, known malware components, and so forth. The information 420 may be based on historical data gathered by the system 400 or from an external resource such as a third-party threat management service.

In another aspect, the information 420 may include information useful for remediation of malware. This may include various tools 416 for remediating malware, including threat-specific tools, general remediation tools, configurable remediation tools, and so forth. This may also include updates, patches, policy revisions and the like useful for repairing or protecting specific vulnerabilities in the software footprint for a virtual machine.

The agent 410 may be a guest agent that monitors access to files 412 on one of the virtual machines 404, e.g., the first virtual machine. The agent 410 may monitor operation of the virtual machine 404, and detect when a file 412 is downloaded to the virtual machine 404 or accessed on the virtual machine 404 for the first time. In an aspect, the agent 410 is configured to respond to an initial access to the file 412 by transmitting the file 412 to an antivirus scanner 414 at a remote location, e.g., an antivirus scanner 414 disposed on the secure virtual machine 407 hosted by the hypervisor 406 or in communication with the secure virtual machine 407 or hypervisor 406. The agent 410 may be further configured to receive one of the plurality of tools 416 in response to transmitting the file 412 to the secure virtual machine 407 hosted by the hypervisor 406, or otherwise receive remediation instructions or code from the secure virtual machine 407 hosted by the hypervisor 406.

The file 412 may include one or more malware components 422, which may be detected and analyzed by the antivirus scanner 414 on the secure virtual machine 407 hosted by the hypervisor 406. The file 412 may be any type of file or program known in the art within such virtual environments 402. The file 412 may be a specific type of object that the agent 410 is programmed to send to the secure virtual machine 407 hosted by the hypervisor 406 when an access is detected, or any file 412 located on the virtual machine 404.

The plurality of tools 416 may include multiple configurations of a generic malware removal tool. The plurality of tools 416 may also or instead include specific removal tools for specific malware components 422 or full cleanup tools, e.g., fully loaded antivirus programs/applications and the like. The plurality of tools 416 may include tools for removing antivirus or anti-malware components installed on a virtual machine 404. For example, the virtual machine 404 may receive a first tool for removing malware components 422, and then a second tool for removing of the first tool after the first tool has remediated the malware threat.

The tools 416 may also or instead include other modules of functionality that can be used in the system 400 and deployed by the secure virtual machine 407. For example, the tools 416 may include one or more of a suspicious process inspection tool, a firewall (e.g., to block an infected machine accessing a network), a quarantining tool that blocks all network access, a communication module (e.g., to inform a user or administrator that a specific action has been undertaken), and so forth.

The instructions 418 may include removal instructions for any tools installed onto the virtual machine 404. The instructions 418 may also or instead include malware removal instructions, e.g., for use in conjunction with one or more of the plurality of tools 416.

The agent 410 may detect access to the file 412 on a virtual machine 404. The agent 410 may respond by transmitting the file 412 to the antivirus scanner 414 included on the secure virtual machine 407 hosted by the hypervisor 406. The secure virtual machine 407 may be configured to respond to receipt of the file 412 from the agent 410 of the virtual machine 404 by analyzing the file 412 with the antivirus scanner 414, e.g., for detection of a malware component 422.

When a malware component 422 is detected, the secure virtual machine 407 hosted by the hypervisor 406 may select at least one tool from the plurality of tools 416 thereby establishing a selected tool 424 for remediating the malware component 422. When the antivirus scanner 414 detects and specifically identifies the malware component 422 as a known malware component 422 based upon information 420 in the data store 408, the selected tool 424 may be a specific tool that corresponds to the known malware component 422. When the antivirus scanner 414 does not identify the detected malware component 422 as a known malware component 422, the selected tool 424 may be a generic tool for remediating malware. In an aspect, the generic tool is selected and then configured for the type of malware component 422 detected by antivirus scanner 414. To this end, the secure virtual machine 407 hosted by the hypervisor 406 may determine one or more actions required to remediate the malware component 422 and configure one or more of the plurality of tools 416, as described herein, to perform the one or more actions. The one or more actions may include one or more of a file deletion, a process termination, a removal of registry keys, and the like.

In an aspect, the selected tool 424 includes a rootkit removal tool. In another aspect, the selected tool 424 includes a full antivirus application or a threat specific removal tool.

The selected tool 424 may be transmitted by the secure virtual machine 407 hosted by the hypervisor 406 to the virtual machine 404.

The agent 410 may be configured to receive the selected tool 424 from the secure virtual machine 407 hosted by the hypervisor 406, install the selected tool 424 as necessary, and execute the selected tool 424. The agent 410 may be further configured to generate an execution status 426 for the selected tool 424 that indicates whether remediation of the malware component 422 was successful. The agent 410 may transmit the execution status 426 to the secure virtual machine 407 hosted by the hypervisor 406. In another aspect, the selected tool 424 may be configured to generate the execution status 426 and/or to transmit the execution status 426 to the secure virtual machine 407 hosted by the hypervisor 406. The execution status 426 may include one of: a 'success,' i.e. indicating that the remediation was successful; a 'failure,' i.e. indicating that the remediation could not be completed; an 'error,' i.e. indicating that the selected tool 424 could not be executed; and an 'incomplete,' i.e. indicating that one or more additional steps are required to complete the remediation. Other states are also possible. For example, the status may indicate that the agent 410 or selected tool 424 was unable to confirm or verify successful completion of the remediation.

The secure virtual machine 407 hosted by the hypervisor 406 may receive the execution status 426 from the agent 410 for the selected tool 424. When the execution status 426 indicates a successful remediation, the secure virtual machine 407 may transmit one or more instructions 418 to the virtual machine 404 to remove the selected tool 424. The agent 410 may be configured to respond to the instructions 418 by removing the selected tool 424 on the virtual machine 404, e.g., by uninstalling the selected tool 424, deleting any associated files, or otherwise cleaning up related components, icons, registry entries, and so forth. In another aspect, the selected tool 424 may be configured to self-uninstall or self-remove so that no intervention is required from the agent 410.

In another aspect, the agent 410 on the virtual machine 404 is configured to perform an on-demand scan, e.g., at a time selected by the hypervisor 406 or by an administrator. The on-demand scan may include an installation of an antivirus tool 428, an execution of the antivirus tool 428, and a removal of the antivirus tool 428. The antivirus tool 428 may be the same or similar to any of the tools described herein, including without limitation a threat specific removal tool, a full antivirus application, or anything in-between. The virtual machine 404 may receive the antivirus tool 428 from the secure virtual machine 407 hosted by the hypervisor 406. The on-demand scan may be performed at any time that might be initiated by the agent 410 or the secure virtual machine 407 hosted by the hypervisor 406, e.g., on a predetermined schedule, after a detected compromise of the virtual machine 404 or other devices within an enterprise network or the like, or after a new and dangerous threat is identified elsewhere within an enterprise network.

In one aspect, the agent 410 on the virtual machine 404 may be configured to perform a rootkit scan using a rootkit scanner 430. To this end, the agent 410 may receive the rootkit scanner 430, e.g., from the secure virtual machine 407 hosted by the hypervisor 406, install the rootkit scanner 430 on the virtual machine 404, execute the rootkit scanner 430 on the virtual machine 404, uninstall the rootkit scanner 430 from the virtual machine 404, report a result of the rootkit scanner 430, e.g., to the secure virtual machine 407 hosted by the hypervisor 406, receive a rootkit removal tool responsive to the result, e.g., from the secure virtual machine 407 hosted by the hypervisor 406, install the rootkit removal tool on the virtual machine 404, execute the rootkit removal tool on the virtual machine 404, and uninstall the rootkit removal tool from the virtual machine 404.

In an aspect, the virtual machine 404 includes a user interface 432. The user interface 432 may be configured to receive a right-click scan request from a user for one or more files 412 included on the virtual machine 404. In general, this may be realized through a user interface tool that responds to a right mouse click or similar input when a cursor is hovering over an icon for a file or application by presenting an option to perform a security scan of the file. The user interface 432 may also or instead be configured for a user or administrator to schedule future scans and perform on-demand scans.

As referenced above, the plurality of tools 416 may include tools/components other than traditional malware remediation tools, such as a suspicious process inspection tool, a firewall, a quarantining tool, a communication module, and the like. For example, in one aspect, if the secure virtual machine 407 (e.g., through the antivirus scanner 414) detects specific files then the secure virtual machine 407 can transfer a tool to further analyze the behavior of the virtual machine 404—for example, for unexpected network traffic or unexpected processes, where these can be neutralized by the transmitted and installed tool. In another aspect, if the virtual machine 404 is infected and there is no remediation action known or available, the secure virtual machine 407 can transfer a tool to be installed that can block all network access, effectively quarantining the virtual machine 404 from the system/network until a remediation action is available. In yet another aspect, the secure virtual machine 407 can transfer a communication module for installation on the virtual machine 404, where the communications module informs a user that a specific action has been undertaken (e.g., that the virtual machine 404 has been quarantined from a network).

Figure 5:
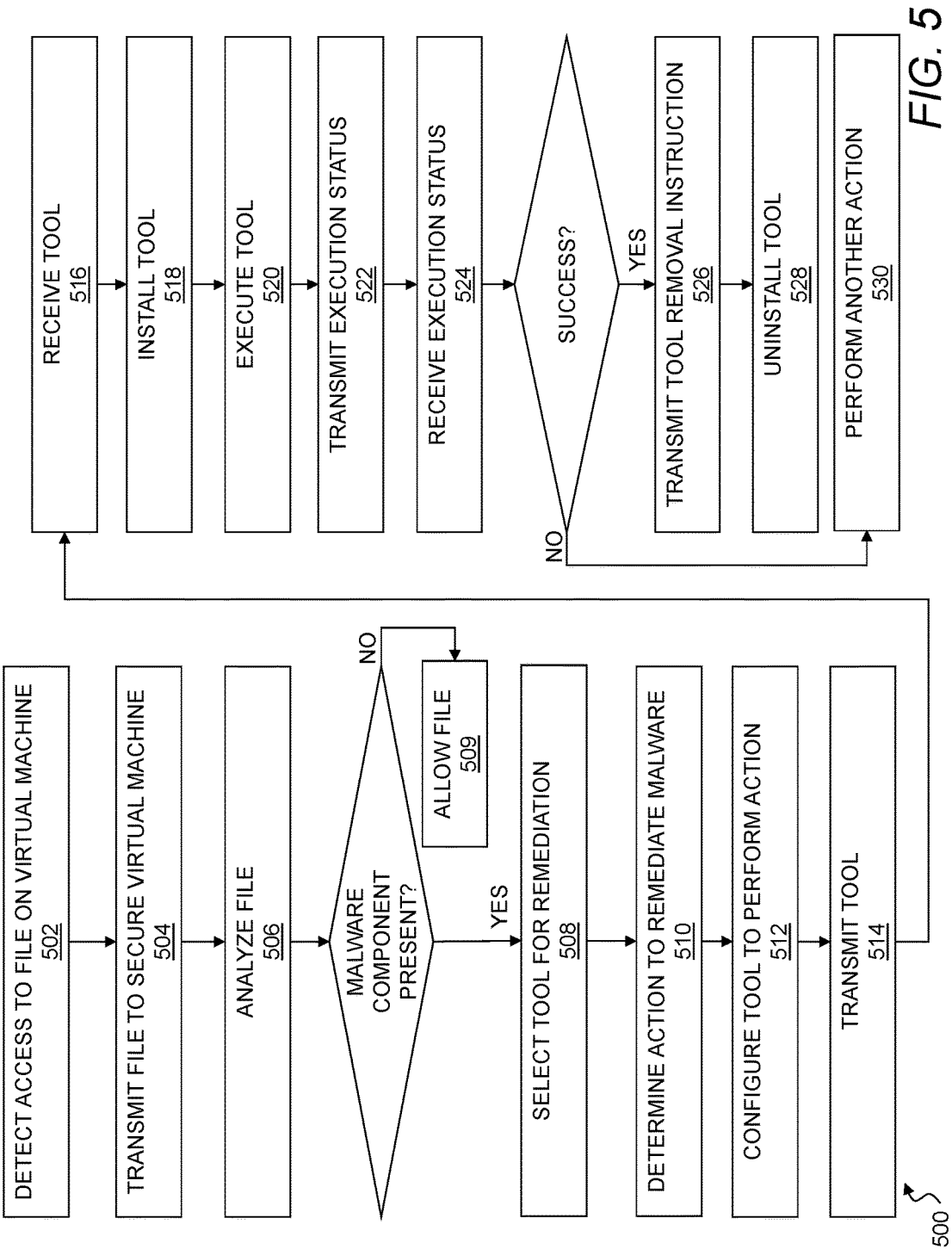
FIG. 5 is a flow chart of a method for managing malware in a virtualized environment.

FIG. 5 is a flow chart of a method 500 for managing malware in a virtualized environment. In an aspect, a computer program product comprising computer executable code embodied in a non-transitory computer readable medium that, when executing on one or more computing devices, such as any of those described herein, performs any or all of the steps the method 500 or any other methods described herein.

As shown in step 502, the method 500 may include detecting an access to a file on a virtual machine. In an aspect, detecting the access to the file includes receiving a right-click scan request for the file in a user interface of the virtual machine. Detecting access may also or instead include detecting a download of a new file to the virtual machine, detecting an unpacking of files from an installer or other compressed file container or the like, or an access to a file that is not recognized or previously opened on the virtual machine.

As shown in step 504, the method 500 may include transmitting the file to a secure virtual machine hosted by a hypervisor for the virtual machine. This may include transmitting locally or remotely to the secure virtual machine, according to an architecture of the virtualized environment and the relative location of the virtual machine, secure virtual machine, and the hypervisor within that environment.

As shown in step 506, the method 500 may include analyzing the file, e.g., with an antivirus scanner on the secure virtual machine hosted by the hypervisor. This may include analyzing the file using any suitable techniques. For example, this may include static analysis of the file using signatures or other information. This may also or instead include behavioral analysis, reputation analysis, and so forth. In another aspect, this may include executing the file in a sandbox or other isolated environment to detect possible malicious behavior. Where the file is compressed or otherwise packaged or grouped, or where the file includes attachments or the like this may also or instead include unpacking and inspecting the corresponding payload.

If the antivirus scanner does not identify a malware component, the method 500 may proceed to step 509 where the file is allowed to be accessed/run/executed on the virtual machine. In an aspect, the secure virtual machine may send instructions to the virtual machine that the file is whitelisted, clean, or otherwise approved to be accessed and used on the virtual machine. The method 500 may the optionally return to step 502 where a next access to another file is detected.

If the antivirus scanner identifies a malware component, the method 500 may proceed to step 508, which includes selecting one of a plurality of tools for malware-specific remediation of the malware component, thereby providing a selected tool. Selection of the tool may be performed by the secure virtual machine, e.g., an antivirus scanner on the secure virtual machine. To this end, the plurality of tools may be included on the secure virtual machine, where the plurality of tools may include multiple configurations of a generic removal tool, threat-specific removal tools, a full antivirus application or the like. In an aspect, the selected tool is a specific tool known to remediate a known malware component. In another aspect, the selected tool may be a generic tool that can be configured to remediate different types of threats. The secure virtual machine may instead select a full cleanup tool, e.g., a fully loaded antivirus program/application, for sending to the virtual machine, e.g., when an unknown malware component is identified. In another aspect the secure virtual machine or hypervisor may contact a threat management facility or other external service or the like for assistance in identifying a malware component or locating suitable remediation tools. The selected tool may also or instead access remote resources during execution to facilitate identification and remediation of malware.

As shown in step 510, the method 500 may include determining one or more actions required to remediate the malware component. The one or more actions may be determined based on a known malware component and/or identifiable properties of the malware component. The one or more actions may include a file deletion, a process termination, a removal of registry keys, and the like.

As shown in step 512, the method 500 may include configuring a removal tool to perform the one or more actions. For example, a generic removal tool may be configured to perform the one or more actions determined by the secure virtual machine to remediate the malware component. In another aspect, a specific removal tool is selected based upon an identified known malware component. The specific removal tool may still require configuration based upon actions that are known to be successful in remediating the malware component. Alternatively, the specific removal tool may not require any configuration before sending to the virtual machine for remediation of the malware component.

As shown in step 514, the method 500 may include transmitting the selected tool to the virtual machine. The tool may be transmitted from the secure virtual machine, or from some other repository or data source managed by the hypervisor. In another aspect, the tool may be transmitted from another component such as a third-party threat management facility or other remote threat management tool or resource.

As shown in step 516, the method 500 may include receiving the selected tool at the virtual machine. An agent on the virtual machine may receive the selected tool.

As shown in step 518, the method 500 may include installing the tool on the virtual machine. The tool may be installed temporarily on the virtual machine as described herein. It will be understood that some remediation software may not require installation, and may be immediately executable on the virtual machine. Other tools may require a restart of the virtual machine or some other installation step(s). Once the tool has been installed or otherwise prepared for use on the virtual machine, the tool may be executed.

As shown in step 520, the method 500 may include executing the tool on the virtual machine. The tool may be fully self-executing. That is, the tool may not require any user intervention. In another aspect, the tool (or the threat(s) being remediated by the tool) may require user intervention such as selection of remediation actions, verification that suspicious items are malicious, decisions on removal versus quarantine, and so forth.

As shown in step 522, after executing the tool, the method 500 may include generating and transmitting an execution status to the secure virtual machine or hypervisor. In an aspect, the execution status is selected from a group consisting of: a success indicating that the remediation was successful, a failure indicating that the remediation could not be completed, an error indicating that the selected tool could not be executed, and an incomplete indicating that one or more additional steps are required to complete the remediation. In general, the execution status may be generated by a local agent executing on the virtual machine and managing malware detection and remediation, or by the tool that performed the remediation, or some combination of these.

As shown in step 524, the method 500 may include receiving the execution status for the selected tool at the secure virtual machine. The secure virtual machine, hypervisor, or another component in the system, e.g., a data store, may store the execution status with other execution statuses received from virtual machines. In this manner, a historical database of malware remediation for one or more virtual environments may be formed. The historical database can be utilized by the secure virtual machine in selecting tools and determining actions to remediate specific malware components. The historical database may also or instead include information related to the files/objects that were scanned, e.g., the types of files, the malware components detected, and so forth.

As shown in step 526, when the execution status indicates a success for a remediation, the method 500 may include transmitting a tool removal instruction to the virtual machine. The tool removal instruction may be configured to permanently remove the tool that was installed on the virtual machine for remediating the malware component.

As shown in step 528, the method 500 may include uninstalling the selected tool on the virtual machine. Uninstalling the selected tool on the virtual machine may be performed by the agent on the virtual machine in response to the tool removal instruction. Uninstalling the selected tool on the virtual machine may involve permanently removing the selected tool on the virtual machine thereby freeing up memory and processing capacity on the virtual machine.

As shown in step 530, when the execution status does not indicate a success for a remediation, the method 500 may include performing another action. The other action may include, without limitation: removing the file from the virtual machine; determining one or more different actions to remediate the malware and configuring a tool accordingly to perform the one or more different actions; selecting a different tool for remediation; contacting a third-party threat management service; contacting an administrator; sending a notification; and so forth.

Figure 6:
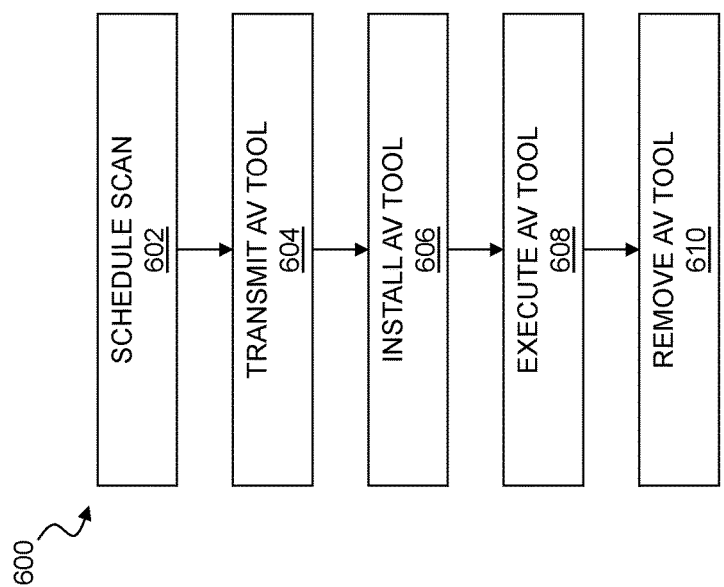
FIG. 6 is a flow chart of a method for managing malware in a virtualized environment using a scheduled scan.

FIG. 6 illustrates a method 600 for managing malware in a virtualized environment using a scheduled scan. The method 600 may be similar to other methods described herein, or the method 600 may supplement other methods described herein, i.e., where a tool selected by the secure virtual machine includes an antivirus tool, which can include, e.g., a threat specific tool or a full antivirus application.

As shown in step 602, the method 600 may include scheduling an on-demand scan for the virtual machine with the hypervisor at a predetermined time. The on-demand scan may be scheduled for a predetermined future time (and/or to recur at predetermined intervals), or the on-demand scan may occur immediately. An administrator or user may manually schedule the on-demand scan, or another entity, such as the hypervisor, may automatically schedule the on-demand scan. A user or administrator may schedule an on-demand scan for the virtual machine through the virtual machine user interface.

As shown in step 604, the method 600 may include transmitting an antivirus tool (e.g., a scanning specific tool or a full antivirus application) to the virtual machine at the predetermined time. In an embodiment where the antivirus tool is a full antivirus application, the antivirus tool may be configured to conduct a full antivirus scan. The antivirus tool may also or instead include one or more tools to facilitate remediation of any malware components identified/detected during an antivirus scan. The tools may automatically execute on the virtual machine when malware components are identified or detected.

As shown in step 606, the method 600 may include installing the antivirus tool on the virtual machine. In general, this may include executing an installer, installing the tool, unpacking the tool and any associated files, adding registry entries, icons, and the like or otherwise adding program code and related content for the application to execute. This may also include a restart of the virtual machine, closing of any applications that might interfere with the installation, or any other steps to complete the installation.

As shown in step 608, the method 600 may include executing the antivirus tool on the virtual machine. In general, it is contemplated that a scheduled scan will include a full antivirus scan, however, other approaches are possible. For example, the antivirus tool may be customized for a particular machine, or specific set of files or directories, or may be customized according to a known patch or update status for the machine so that unnecessary remediation components are not included.

As shown in step 610, the method 600 may include removing the antivirus tool from the virtual machine. In general, this may include uninstalling the tool, deleting the tool and associated files, deleting an installer (if any), deleting associated registry entries, icons, and the like or otherwise removing related software and cleaning up related material. This may also include a restart or other steps to complete the uninstallation.

Figure 7:
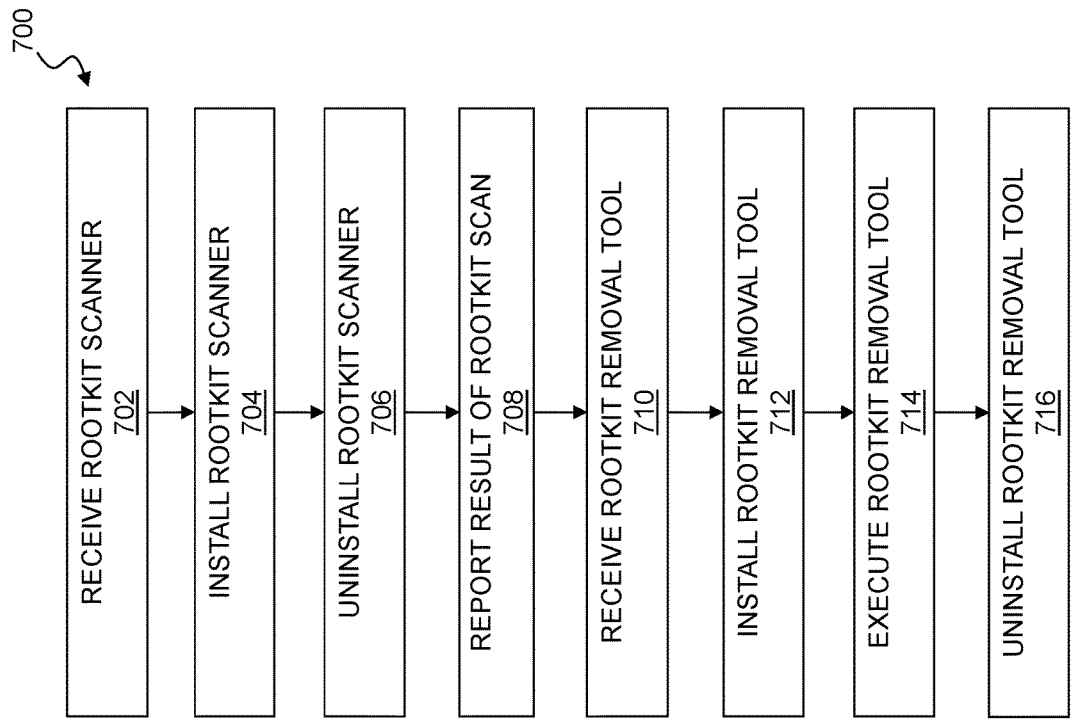
FIG. 7 is a flow chart of a method for managing malware in a virtualized environment using a rootkit scanner.

FIG. 7 is a flow chart of a method 700 for managing malware in a virtualized environment using a rootkit scanner. The method 700 may be similar to other methods described herein, or may supplement other methods described herein, i.e. where a tool selected by the secure virtual machine includes a rootkit removal tool.

As shown in step 702, the method 700 may include receiving a rootkit scanner at the virtual machine. The rootkit scanner may be configured to detect and identify rootkits, i.e. malicious software designed to enable access to areas of the virtual machine or other components of the virtual environment that would not otherwise be permitted, such as when the rootkit masks its existence/identity. Such rootkits may include user mode rootkits, kernel mode rootkits, hypervisor level rootkits, firmware rootkits, and so forth. The rootkit scanner may detect rootkits through behavioral-based, signature-based, and difference-based methods, among others. Rootkits can be particularly difficult to detect and remove, and additional steps may be required to address rootkits. It will be appreciated that, while this procedure is intended specifically to work successfully with rootkits, the method 700 may also or instead be used with other similarly challenging malware exploits.

As shown in step 704, the method 700 may include installing the rootkit scanner. The rootkit scanner may be temporarily installed on the virtual machine. Once installed, the rootkit scanner may be executed on the virtual machine to perform a rootkit scan, which searches for rootkits on the virtual machine.

As shown in step 706, the method 700 may include uninstalling the rootkit scanner. This may also include any subsequent clean up steps such as a virtual machine restart, local process restarts, application restarts, context recovery, icon deletion, registry edits, and so forth.

As shown in step 708, the method 700 may include reporting a rootkit scan result to the secure virtual machine or hypervisor. The result that is reported to the secure virtual machine or hypervisor may be similar to the other results of malware tools/scans discussed herein, including without limitation, whether the rootkit scan was: a success, i.e. the rootkit scan was executed and returned a reliable result; a failure, i.e. the rootkit scan did not execute properly; an incomplete, i.e. indicating that one or more additional steps are required to complete the rootkit scan; and so forth. The result that is reported to the secure virtual machine or hypervisor may also or instead include a number of rootkits detected during the scan and the identity of each of the detected rootkits if known.

Upon receiving the result of the rootkit scan, the secure virtual machine may select a rootkit removal tool for transmitting to the virtual machine.

As shown in step 710, the method 700 may include receiving the rootkit removal tool responsive to the result at the virtual machine from the secure virtual machine. The rootkit removal tool may be a generic rootkit removal tool for a collection of known rootkits or a specific rootkit removal tool configured to remove a specific rootkit identified by the rootkit scanner.

As shown in step 712, the method 700 may include installing the rootkit removal tool. The rootkit removal tool may be temporarily installed on the virtual machine.

As shown in step 714, the method 700 may include executing the rootkit removal tool. The rootkit removal tool may work to remove the rootkit detected by the rootkit scanner on the virtual machine. Rootkits may affect kernel-level operation of a computer, or contain hacked device drivers or other system-level code, and as such the rootkit removal tool may require a number of restarts or other steps during the course of remediation. After the rootkit removal tool has completed a removal process, an execution status of the rootkit removal tool may be generated. The execution status of the rootkit removal tool may be the same or similar to other execution statuses discussed herein including an execution status selected from a group consisting of: a success indicating that the removal of the rootkit was successful, a failure indicating that the removal of the rootkit could not be completed, an error indicating that the rootkit removal tool could not be executed, and an incomplete indicating that one or more additional steps are required to complete the removal of the rootkit.

As shown in step 716, the method 700 may include uninstalling the rootkit removal tool, i.e., when the execution status indicates a successful removal of the rootkit. Uninstalling the rootkit removal tool may be facilitated by a tool removal instruction transmitted to the virtual machine from the secure virtual machine.

Several examples of virtual machine security will now be described.

Figure 8:
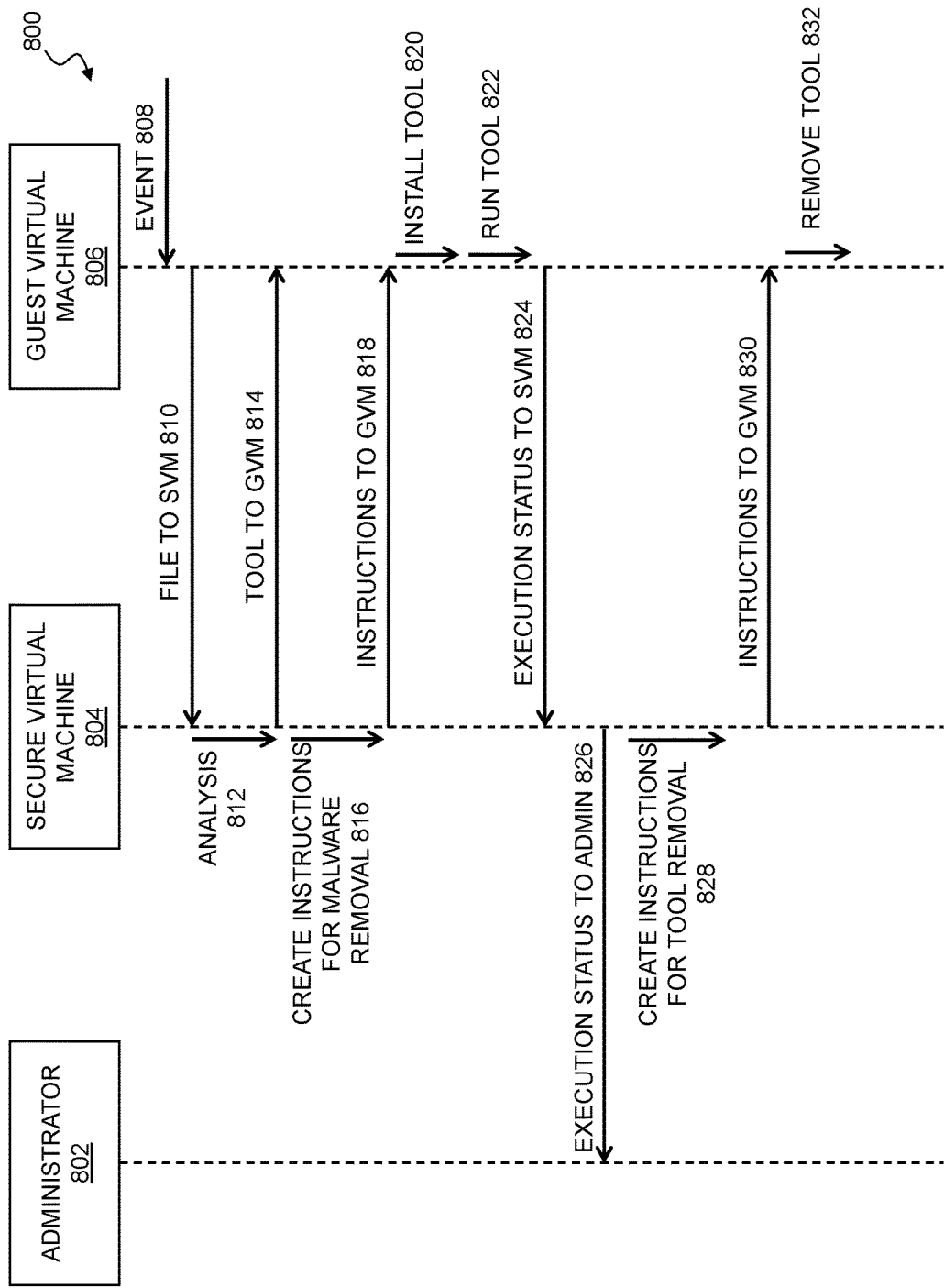
FIG. 8 is a signal diagram for a malware remediation process in a virtualized environment.

FIG. 8 is a signal diagram of a malware remediation process in a virtualized environment. As used herein, a full cleanup of malware may include one or more of a file deletion, a process termination, a removal of registry keys, and the like. The signal diagram depicts a system 800 including an administrator 802, a secure virtual machine 804 (SVM), and a guest virtual machine 806 (GVM). The secure virtual machine 804 and guest virtual machine 806 may be any of the virtual machines described above.

In the prior art, in order to perform a full cleanup of malware, an antivirus (AV) application was typically installed on a guest virtual machine, where it was regularly updated with threat identities and a virus engine. This configuration can use significant memory, particularly where the AV application is a large executable with a substantial local database of threat information. In implementations described herein, however, a virus removal tool may be stored on a secure virtual machine 804 hosted by a hypervisor and then copied onto guest virtual machines 806 only when malware is detected. When a cleanup has been undertaken, the virus removal tool may be removed from the guest virtual machines 806.

As shown by arrow 808, an event may occur on the guest virtual machine 806. The event may include a file event, such as an attempt to access a file on the guest virtual machine 806.

As shown by arrow 810, when a file event is detected, the file may be passed from the guest virtual machine 806 to the secure virtual machine 804, e.g., through an existing communication path.

As shown by arrow 812, an analysis may be performed on the secure virtual machine 804. Specifically, the file may be analyzed by an antivirus application/scanner on the secure virtual machine 804 to determine whether, e.g., the file is malicious, the file includes a malware component, or the like.

As shown by arrow 814, a tool may be sent from the secure virtual machine 804 to the guest virtual machine 806, e.g., if a malware component is identified in the file by the secure virtual machine 804. The tool may include a virus removal tool or any of the other tools described herein.

As shown by arrow 816, the secure virtual machine 804 may create instructions for removal of the malware component. This may include selecting a suitable remediation program, configuring a suitable remediation program, creating code to coordinate installation and execution of one or more remediation programs, and so forth. More generally, the secure virtual machine 804 may determine what actions are need to remediate the detected malware and select a suitable program or group of programs to complete the needed remediation.

As shown by arrow 818, the secure virtual machine 804 may send the instructions to the guest virtual machine 806. In an aspect, the instructions are included as part of the tool that is transmitted to the guest virtual machine 806. The instructions may also or instead include a wrapper, macro, or other code to coordinate operation of the tool on the guest virtual machine 806.

As shown by arrow 820, the tool that was sent from the secure virtual machine 804 to the guest virtual machine 806 may be installed on the guest virtual machine 806.

As shown by arrow 822, the tool may be executed or run on the guest virtual machine 806. This may perform the operations/functionalities of the tool to remediate the malware component, e.g., removing files, terminating processes, removing registry keys, and the like.

As shown by arrow 824, the guest virtual machine 806 may send an execution status to the secure virtual machine 804. The execution status may include: success, i.e. that the remediation was successful; failure, i.e. the remediation failed indicating that the malware component could not be remediated by the tool; error, i.e. an error occurred, indicating that the tool could not be executed on the guest virtual machine 806; or incomplete, i.e. the remediation is incomplete and that one or more additional steps, such as a user task to reboot the virtual machine or the like, are required to complete the remediation.

As shown by arrow 826, the secure virtual machine 804 may send the execution status to the administrator 802. This may occur via a notification or the like on a console of the administrator 802, or through a message sent via email or the like.

As shown by arrow 828, the secure virtual machine 804 may create instructions for removing the tool.

As shown by arrow 830, the secure virtual machine 804 may send the instructions to the guest virtual machine 806 for removing the tool from the guest virtual machine 806.

As shown by arrow 832, the guest virtual machine 806 may remove the tool thereby completing a process for remediating malware on a virtual machine in the system 800.

Figure 9:
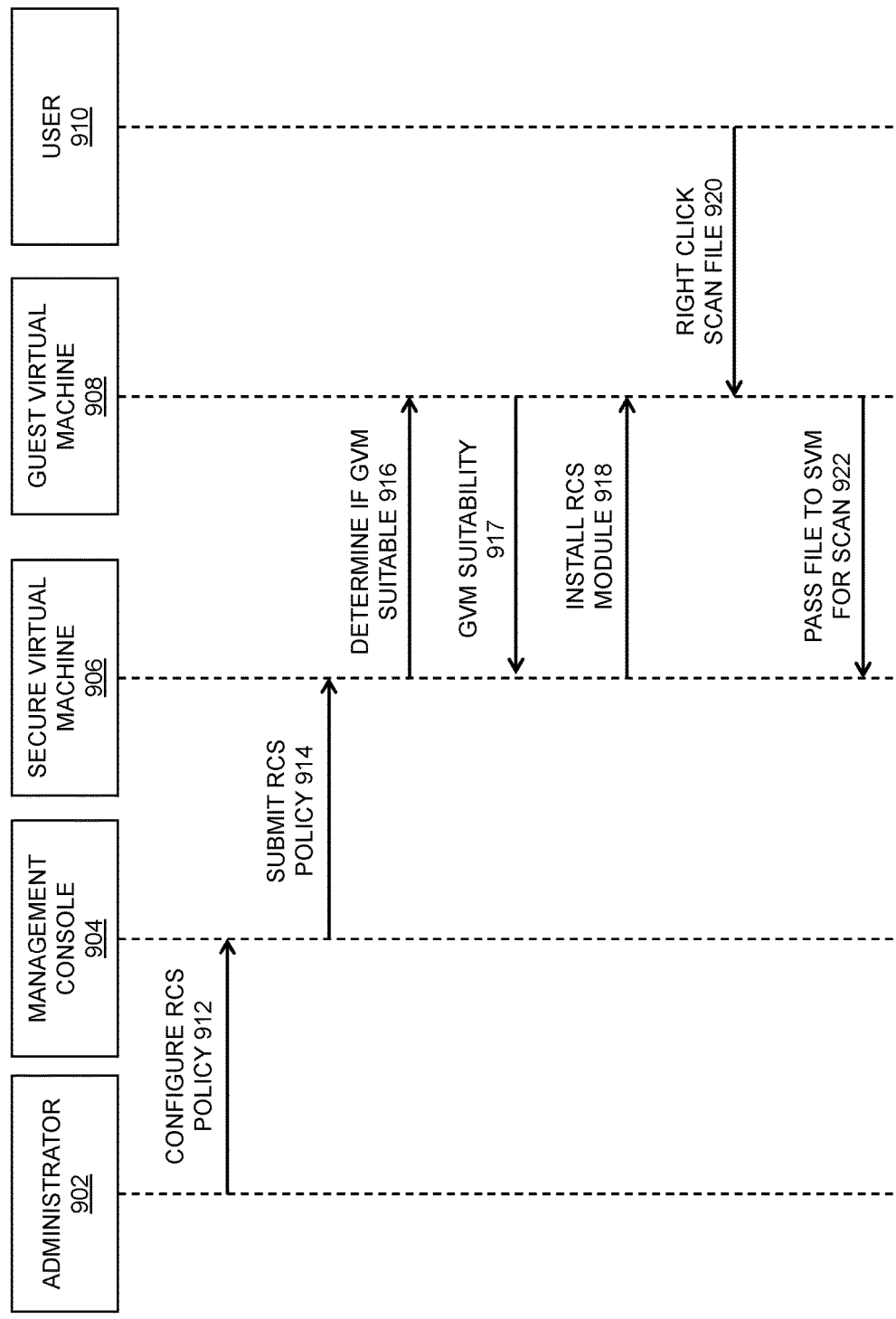
FIG. 9 is a signal diagram for a right-click scanning process in a virtualized environment.

FIG. 9 is a signal diagram for a right-click scanning process in a virtualized environment. As used herein, right-click scanning may refer to any user-initiated scanning, such as a mouse interaction with an icon for a file or application. In general, right-click scanning involves a local plug-in or the like that is installed on a machine where the scan is performed. However, this approach is generally inconsistent with the techniques described herein for host-side file evaluation. As such, adaptations are described herein for applying the malware scanning and remediation techniques described herein to a right-click scanning user experience.

The signal diagram depicts a system 900 including an administrator 902, a management console 904, a secure virtual machine 906, a guest virtual machine 908, and a user 910.

As shown by arrow 912, the administrator 902 may configure the right-click scanning (RCS) policy on the management console 904. This may include the establishment of rules for the virtual environment or system 900 such as when right-click scanning is enabled, what types of malware the right-click scan might search for, and any other parameters that might affect use of a user-initiated right-click scan on a virtual machine. For example, while scanning may still be performed remotely from the virtual machine, a client-side program or software component will generally be required for provide the corresponding user interface functionality. The policy may be used to determine whether this is appropriate or helpful for certain machines, and may be used to avoid installation of such features on a machine such as file server that does not typically host user access.

As shown by arrow 914, the right-click scanning policy may be submitted to the secure virtual machine 906.

As shown by arrow 916, the secure virtual machine 906 may determine whether the guest virtual machine 908 is suitable for the right-click scanning policy. This may include a determination as to whether the guest virtual machine 908 has a suitable platform for the right-click scanning policy, or whether right-click scanning should be enabled for a particular user. The determination as to whether the guest virtual machine 908 is suitable for the right-click scanning policy may also or instead be based on the purpose of the guest virtual machine 908 in the system 900.

As shown by arrow 917, the suitability of the guest virtual machine 908 may be sent back to the secure virtual machine 906, e.g., whether the right-click scanning module can be installed on the guest virtual machine 908. If the right-click scanning module can be installed on the guest virtual machine 908, the right-click scanning module may be transmitted to the guest virtual machine 908 for installation. If the right-click scanning module cannot be installed on the guest virtual machine 908, another action might be taken including without limitation configuring the guest virtual machine 908, configuring the right-click scanning module, selecting another right-click scanning module or other scanner, notifying the administrator 902, and so forth.

As shown by arrow 918, if the guest virtual machine 908 is suitable for the right-click scanning policy, a right-click scanning module may be installed onto the guest virtual machine 908 by the secure virtual machine 906. The right-click scanning module may include a temporary plugin or other code for receiving or responding to a right-click scan.

As shown by arrow 920, once the right-click scanning module is installed on the guest virtual machine 908, the user 910 may perform right-click scanning. The user 910 may thus right-click scan a file on the guest virtual machine 908. The right-click scan may include a selection of a file for scanning, i.e. by the right-click scanning module or by the secure virtual machine 906.

As shown by arrow 922, the selected file may be passed to the secure virtual machine 906 for further scanning.

Figure 10:
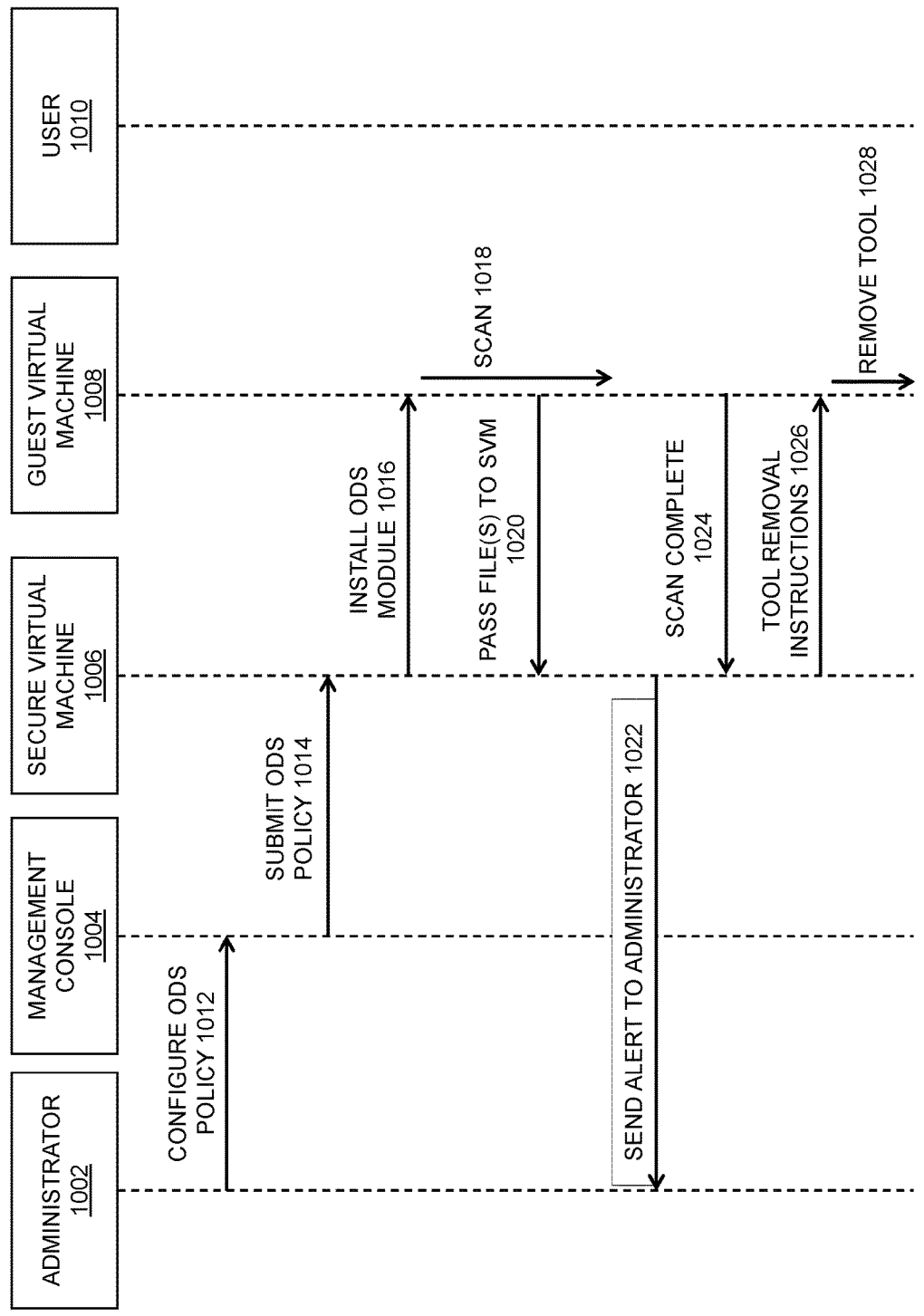
FIG. 10 is a signal diagram for a process for on-demand scanning in a virtualized environment.

FIG. 10 is a signal diagram of an on-demand scanning process in a virtualized environment. In the prior art, in order to facilitate on-demand scanning (ODS), an application, e.g., a full antivirus application, is typically installed on the guest virtual machine, where the application can access each file in turn. Implementations may improve upon these techniques by having the host virtual machine install a relatively small module on the guest virtual machine when the on-demand scan is due. The host virtual machine or module may determine which files are to be excluded from the scan, and then pass each file to be scanned to the host virtual machine for scanning. When the scan is complete the module may remove itself. Thus, a module may be configured and installed on a virtual machine, such as within the guest agent described above, to filter files that should be scanned remotely.

The system 1000 may include an administrator 1002, a management console 1004, a secure virtual machine 1006, a guest virtual machine 1008, and a user 1010.

As shown by arrow 1012, the administrator 1002 may configure the on-demand scan on the management console 1004. This may include specifying when on-demand scans can or should be performed, what files should be included or excluded, and so forth.

As shown by arrow 1014, the on-demand scan policy may be submitted to the secure virtual machine 1006.

As shown by arrow 1016, an on-demand scanning module may be sent from the secure virtual machine 1006 to the guest virtual machine 1008 for installation on the guest virtual machine 1008. This may occur when the on-demand scan is set to begin. The on-demand scanning module may determine that certain files or directories are to be excluded from the on-demand scan so that a scan of the guest virtual machine 1008 can proceed accordingly.

As shown by arrow 1018, the on-demand scan may be initiated on the guest virtual machine 1008. Thus, the scanning may occur on the guest virtual machine 1008 without copying files to the guest virtual machine 1008, as the scanning tool contains the configuration and malware detection identities that may be needed. The on-demand scan may scan any files, objects, directories and the like that are not explicitly excluded by the on-demand scanning module.

As shown by arrow 1020, during the on-demand scan on the guest virtual machine 1008, files selected from the scan may be transmitted to the secure virtual machine 1006, e.g., if the scanning tool determines that additional analysis is required. If a file or directory is excluded, it is not passed to the secure virtual machine 1006, which can save valuable scanning time.

As shown by arrow 1022, if malware is detected, an alert may be sent to the administrator 1002 from the secure virtual machine 1006. This may occur through an alert sent through or received on the management console 1004, and remediation may be undertaken as more generally described above.

As shown by arrow 1024, the guest virtual machine 1008 may notify the secure virtual machine 1006 when the scan is complete.

As shown by arrow 1026, when the scan is complete, the secure virtual machine 1006 may send tool removal instructions to the guest virtual machine 1008.

As shown by arrow 1028, the tool may be removed from the guest virtual machine 1008, e.g., using the tool removal instructions. The tool removal instructions may then also be removed from the guest virtual machine 1008, thereby freeing up more processing capacity or memory on the guest virtual machine 1008.

Figure 11:
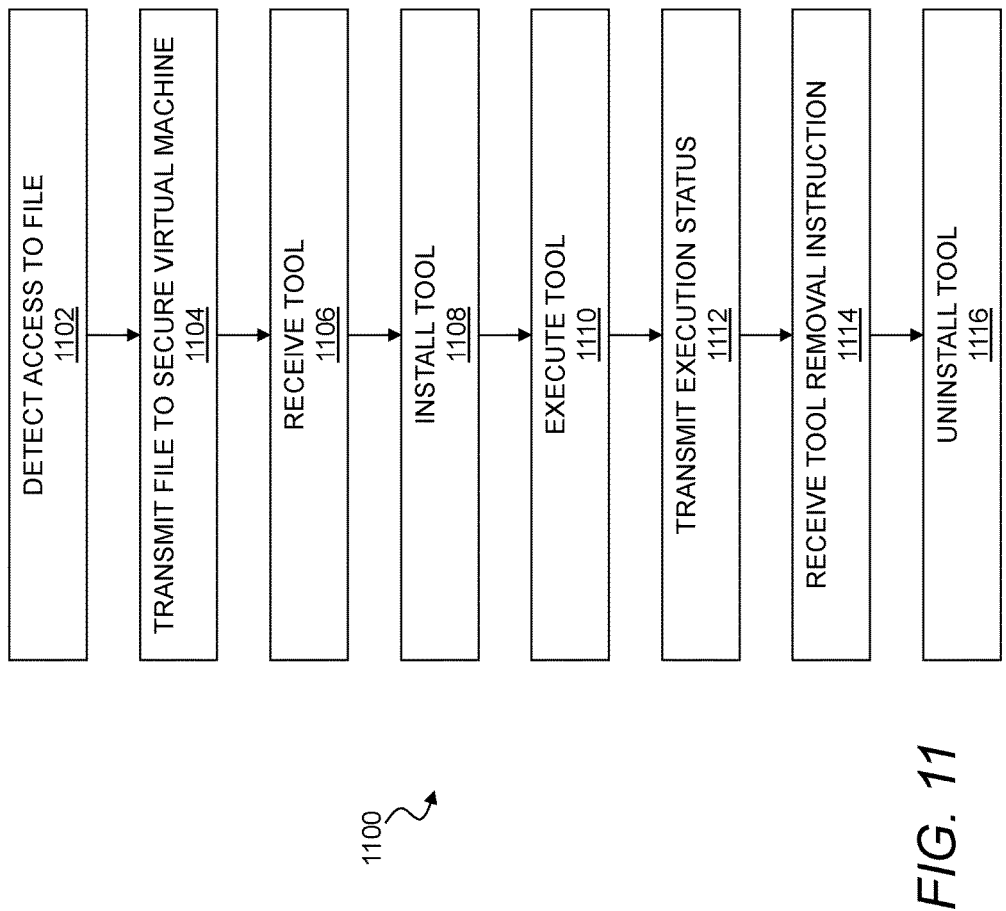
FIG. 11 is a flow chart of a method for operating a virtual machine to detect and remediate malware.

FIG. 11 is a flow chart of a method 1100 for operating a virtual machine to detect and remediate malware.

As shown in step 1102, the method 1100 may include detecting an access to a file on a virtual machine. This may include access by any process executing on the virtual machine such as the first time a file is identified or opened. This may also or instead include file detection in response to a right-click scan, an on-demand scan of a directory, or any other user-initiated or machine-initiated discovery of or use of a file.

As shown in step 1104, the method 1100 may include transmitting the file to a secure virtual machine hosted by a hypervisor for the virtual machine.

As shown in step 1106, the method 1100 may include receiving a tool at the virtual machine. The tool may include a tool selected by the secure virtual machine for malware-specific remediation of a known malware component identified in the file.

As shown in step 1108, the method 1100 may include installing the tool on the virtual machine. It will be appreciated that this may include installing a program, restarting the virtual machine, closing applications that might interfere with the installation, or any other steps suitable for completing installation of the tool. In another aspect, the tool may execute directly as an executable file without any need for installation. In another aspect where the malware is a rootkit or the like, this may also include a preliminary receipt and installation of a rootkit detection tool, followed by uninstallation of the rootkit detection tool and an installation of a rootkit remediation tool As shown in step 1110, the method 1100 may include executing the tool on the virtual machine.

As shown in step 1112, the method 1100 may include transmitting an execution status to the secure virtual machine. The execution status may be generated by the virtual machine or another component, where the execution status is based on the performance of the tool in remediating the malware component.

As shown in step 1114, the method 1100 may include receiving a tool removal instruction from the secure virtual machine.

As shown in step 1116, the method 1100 may include responding to the tool removal instruction by removing the tool from the virtual machine, such as by uninstalling the tool, deleting a file containing the tool, removing an icon, registry entries, or other components of the tool, or any other suitable deletion, uninstallation, and cleanup procedures.

Figure 12:
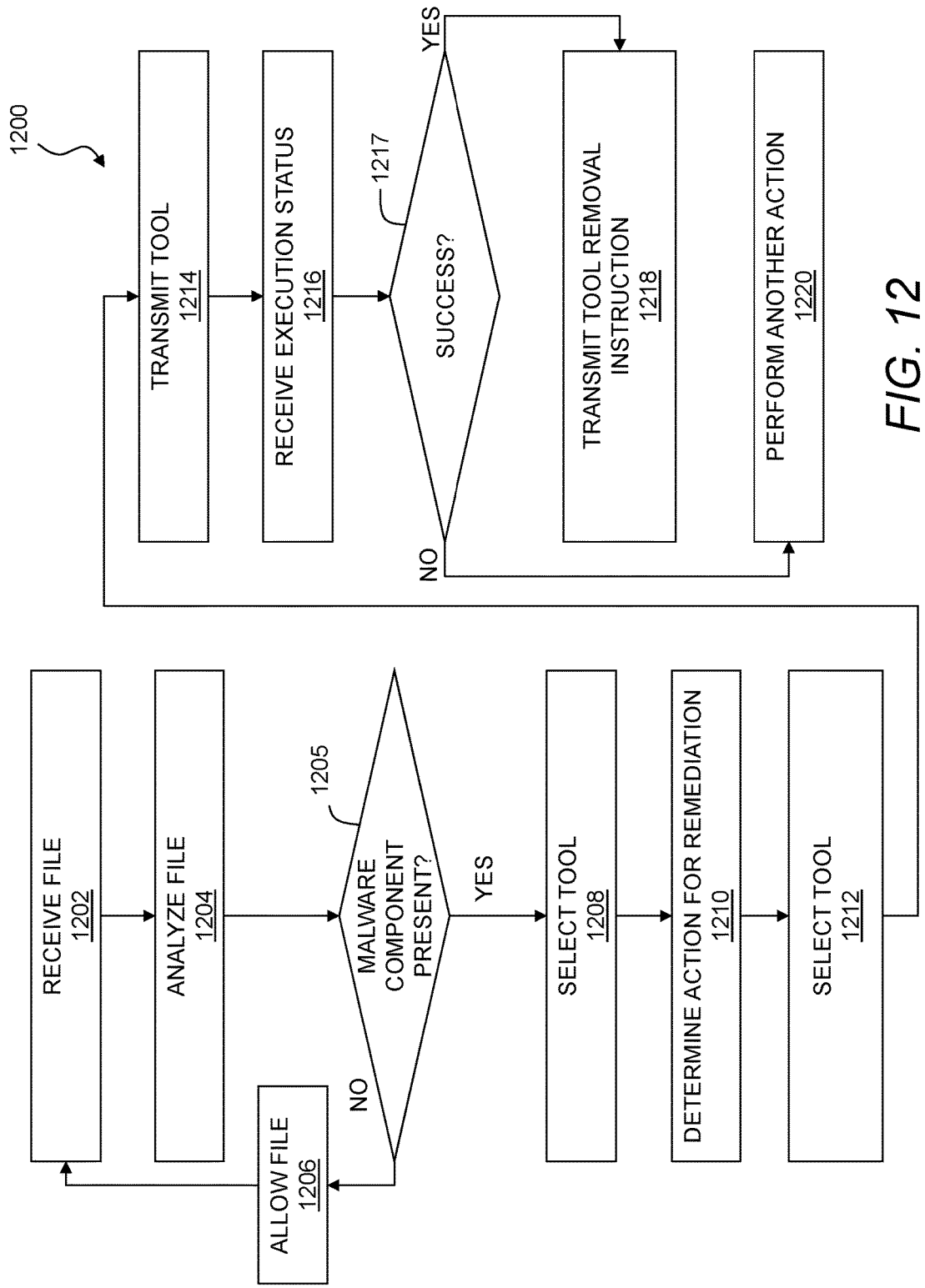
FIG. 12 is a flow chart of a method for operating a secure virtual machine hosted by a hypervisor to detect and remediate malware in a virtualization environment.

FIG. 12 is a flow chart of a method 1200 for operating a secure virtual machine hosted by a hypervisor to detect and remediate malware detection in a virtualization environment.

As shown in step 1202, the method 1200 may include receiving a file at the secure virtual machine. The file may include a file for which access was detected on a virtual machine, a file for which a right-click scan was requested, or any other file identified by a virtual machine as suitable for malware scanning. The file may be received from an agent on the virtual machine.

As shown in step 1204, the method 1200 may include analyzing the file, e.g., with an antivirus scanner on the secure virtual machine hosted by the hypervisor.

As shown in step 1205, the file may be analyzed for the presence of a malware component. As shown in step 1206, when the antivirus scanner does not identify a malware component, the method 1200 may include allowing access to the file, allowing the file to open/execute/run, and so forth, thereby ending the method 1200. As shown in step 1208, when the antivirus scanner identifies a known malware component, the method 1200 may include selecting one of a plurality of tools for malware-specific remediation of the known malware component. The plurality of tools may include multiple configurations of a generic removal tool.

As shown in step 1210, the method 1200 may include determining one or more actions required to remediate the known malware component.

As shown in step 1212, the method 1200 may include selecting a tool for performing remedial actions. As described above, this may include selecting a malware-specific tool, selecting a generic malware tool, customizing a configurable malware tool, and so forth. The secure virtual machine may thus provide a selected tool for use by the virtual machine.

As shown in step 1214, the method 1200 may include transmitting the selected tool to the virtual machine.

As shown in step 1216, the method 1200 may include receiving an execution status for the selected tool, which may be evaluated by the secure virtual machine as shown in step 1217.

As shown in step 1218, when the execution status indicates a success for a remediation, the method 1200 may include transmitting a tool removal instruction to the virtual machine.

As shown in step 1220, when the execution status does not indicate a success for a remediation, the method 1200 may include performing another action. This may include, without limitation: removing the file from the virtual machine; determining one or more different actions to remediate the malware component and configuring a tool these additional or different actions; selecting a different tool for remediation; and so forth. More generally, a variety of execution statuses may be received from the virtual machine, with corresponding possible actions by the secure virtual machine according to whether the outcome was incomplete, inconclusive, or otherwise uncertain.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes, such as random access memory associated with a processor, or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource, e.g., a server or cloud computer or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for managing malware in a virtualized environment, the computer program product comprising computer executable code embodied in a non-transitory computer readable medium that, when executing on one or more computing devices, performs the steps of:
   detecting an access to a file on a virtual machine;
   transmitting the file to a secure virtual machine hosted by a hypervisor for the virtual machine;
   analyzing the file with an antivirus scanner on the secure virtual machine;
   when the antivirus scanner identifies a known malware component, performing the steps of:
      selecting one of a plurality of tools for malware-specific remediation of the known malware component, wherein the plurality of tools include multiple configurations of a generic removal tool;
      determining one or more actions required to remediate the known malware component; and
      configuring the generic removal tool to perform the one or more actions, thereby providing a selected tool;
   transmitting the selected tool to a security agent on the virtual machine;
   receiving the selected tool at the security agent on the virtual machine;
   executing the selected tool by the security agent on the virtual machine;
   receiving an execution status for the selected tool at the secure virtual machine; and
   when the execution status indicates a success for a remediation, transmitting a tool removal instruction to the security agent on the virtual machine, the tool removal instruction initiating removal of the selected tool, by the security agent, from the virtual machine, the removal of the selected tool freeing up at least one of memory or processing capacity on the virtual machine.

2. A system comprising:
   a data store including information identifying a plurality of known malware components and a plurality of tools for malware-specific remediation;
   a first virtual machine, the first virtual machine including a guest agent configured to respond to an access to a file on the first virtual machine by transmitting the file to an antivirus scanner at a remote location, and the guest agent further configured to receive one of the plurality of tools in response; and
   a hypervisor for managing a plurality of virtual machines including the first virtual machine and a secure virtual machine, the secure virtual machine hosting the antivirus scanner, and the secure virtual machine configured to respond to a receipt of the file from the first virtual machine by analyzing the file with the antivirus scanner and, when one of the plurality of known malware components is identified by the antivirus scanner, to perform the steps of:
      selecting at least one tool of the plurality of tools, the at least one tool corresponding to the one of the plurality of known malware components identified by the antivirus scanner;
   transmitting the at least one tool to a security agent on the first virtual machine;
   receiving an execution status for the at least one tool; and
   when the execution status indicates a success for a remediation, transmitting a tool removal instruction to the security agent on the first virtual machine to remove the at least one tool, the tool removal instruction initiating removal of the at least one tool, by the security agent, from the first virtual machine, the removal of the at least one tool freeing up at least one of memory or processing capacity on the first virtual machine.

3. The system of claim 2 wherein the guest agent of the first virtual machine is further configured to perform the steps of:
   receiving the at least one tool from the secure virtual machine;
   installing the at least one tool;
   executing the at least one tool; and
   transmitting the execution status to the secure virtual machine.

4. The system of claim 2 wherein the guest agent of the first virtual machine is further configured to respond to the tool removal instruction by uninstalling the at least one tool on the first virtual machine.

5. The system of claim 2 wherein the plurality of tools include multiple configurations of a generic removal tool.

6. The system of claim 5 wherein the secure virtual machine determines one or more actions required to remediate the one of the plurality of known malware components and configures the generic removal tool to perform the one or more actions.

7. The system of claim 6 wherein the one or more actions include one or more of a file deletion, a process termination, and a removal of registry keys.

8. The system of claim 6 wherein the execution status is selected from a group consisting of a success indicating that the remediation was successful, a failure indicating that the remediation could not be completed, an error indicating that the at least one tool could not be executed, and an incomplete indicating that one or more additional steps are required to complete the remediation.

9. The system of claim 2 wherein the guest agent on the first virtual machine is configured to perform an on-demand scan at a time selected by the hypervisor, the on-demand scan including an installation of an antivirus tool, an execution of the antivirus tool, and a removal of the antivirus tool.

10. The system of claim 2 wherein the guest agent on the first virtual machine is configured to perform a rootkit scan by performing the steps of:
receiving a rootkit scanner;
installing the rootkit scanner;
uninstalling the rootkit scanner;
reporting a result of the rootkit scanner to the secure virtual machine;
receiving a rootkit removal tool responsive to the result from the secure virtual machine;
installing the rootkit removal tool;
executing the rootkit removal tool; and
uninstalling the rootkit removal tool.

11. A method comprising:
detecting an access to a file on a virtual machine;
transmitting the file to a secure virtual machine hosted by a hypervisor for the virtual machine;
analyzing the file with an antivirus scanner on the secure virtual machine;
when the antivirus scanner identifies a known malware component, selecting one of a plurality of tools for malware-specific remediation of the known malware component, thereby providing a selected tool;
transmitting the selected tool to a security agent on the virtual machine;
receiving the selected tool at the security agent on the virtual machine;
executing the selected tool on the virtual machine;
receiving an execution status for the selected tool at the secure virtual machine; and
when the execution status indicates a success for a remediation, transmitting a tool removal instruction to the security agent on the virtual machine, the tool removal instruction initiating removal of the selected tool, by the security agent, from the virtual machine, the removal of the selected tool freeing up at least one of memory or processing capacity on the virtual machine.

12. The method of claim 11 further comprising:
installing the selected tool on the virtual machine; and
after executing the selected tool, transmitting the execution status to the secure virtual machine.

13. The method of claim 11 wherein the virtual machine responds to the tool removal instruction by uninstalling the selected tool on the virtual machine.

14. The method of claim 11 wherein the plurality of tools include multiple configurations of a generic removal tool.

15. The method of claim 14 wherein the secure virtual machine performs the steps of:
determining one or more actions required to remediate the known malware component; and
configuring the generic removal tool to perform the one or more actions.

16. The method of claim 15 wherein the one or more actions include one or more of a file deletion, a process termination, and a removal of registry keys.

17. The method of claim 15 wherein the execution status is selected from a group consisting of a success indicating that the remediation was successful, a failure indicating that the remediation could not be completed, an error indicating that the selected tool could not be executed, and an incomplete indicating that one or more additional steps are required to complete the remediation.

18. The method of claim 11 wherein detecting the access to the file includes receiving a right-click scan request for the file in a user interface of the virtual machine.

19. The method of claim 11 further comprising:
scheduling an on-demand scan for the virtual machine with the hypervisor at a predetermined time;
transmitting an antivirus tool to the virtual machine at the predetermined time;
installing the antivirus tool on the virtual machine;
executing the antivirus tool on the virtual machine; and
removing the antivirus tool from the virtual machine.

20. The method of claim 11 wherein the selected tool is a rootkit removal tool, the method further comprising the steps of:
receiving a rootkit scanner at the virtual machine;
installing the rootkit scanner;
uninstalling the rootkit scanner;
reporting a result of the rootkit scanner to the secure virtual machine;
receiving a rootkit removal tool responsive to the result at the virtual machine from the secure virtual machine;
installing the rootkit removal tool;
executing the rootkit removal tool; and
uninstalling the rootkit removal tool.

* * * * *